(12) United States Patent
Chen et al.

(10) Patent No.: US 11,450,137 B2
(45) Date of Patent: Sep. 20, 2022

(54) DISPLAY DEVICE FOR IN-SCREEN FINGERPRINT IDENTIFICATION

(71) Applicant: Au Optronics Corporation, Hsinchu (TW)

(72) Inventors: Ming-Yao Chen, Hsinchu (TW); Cheng-Hsing Lin, Hsinchu (TW); Shu-Wen Tzeng, Hsinchu (TW); Hsin-Lin Hu, Hsinchu (TW); Jui-Chi Lo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/159,159

(22) Filed: Jan. 27, 2021

(65) Prior Publication Data

US 2022/0036030 A1 Feb. 3, 2022

(30) Foreign Application Priority Data

Jul. 29, 2020 (TW) .................................. 109125593

(51) Int. Cl.
*G06V 40/13* (2022.01)
*G09G 3/20* (2006.01)

(52) U.S. Cl.
CPC ........... *G06V 40/1318* (2022.01); *G09G 3/20* (2013.01); *G09G 2300/0809* (2013.01)

(58) Field of Classification Search
CPC ................. G06V 40/1318; G09G 3/20; G09G 2300/0809
See application file for complete search history.

(56) References Cited

U.S. PATENT DOCUMENTS 6,329,974 B1 * 12/2001 Walker ................. G09G 3/3651
345/98
10,896,926 B2 1/2021 Wang et al.
2001/0028060 A1 * 10/2001 Yamazaki ............ G09G 3/3258
257/E29.279

(Continued)

FOREIGN PATENT DOCUMENTS

CN 101770316 7/2010
CN 109031819 12/2018

(Continued)

*Primary Examiner* — Stephen G Sherman
(74) *Attorney, Agent, or Firm* — JCIPRNET

(57) ABSTRACT

A display device adapted to perform in-screen fingerprint identification is provided. The display device includes a plurality of sub-pixel circuits, a plurality of light sensing circuit stages, and a plurality of sensing drive lines. The light sensing circuit stages correspond to the sub-pixel circuits. The sensing drive lines drive the light sensing circuit stages sequentially. In a first time interval, a first sensing drive line among the sensing drive lines provides a first sensing drive signal to a $q^{th}$ light sensing circuit stage and a latter light sensing circuit stage among the light sensing circuit stages. In the first time interval, the $q^{th}$ light sensing circuit stage performs a light sensing reset operation according to the first sensing drive signal, and the latter light sensing circuit stage performs a light sensing write operation according to the first sensing drive signal.

14 Claims, 7 Drawing Sheets

(56) References Cited

U.S. PATENT DOCUMENTS

| | | | |
|---|---|---|---|
| 2008/0136983 A1* | 6/2008 | Huang | G09G 3/3659 345/87 |
| 2013/0100108 A1* | 4/2013 | Chiang | G09G 3/3659 345/212 |
| 2019/0180667 A1 | 6/2019 | Lin et al. | |
| 2020/0176502 A1 | 6/2020 | Wang et al. | |

FOREIGN PATENT DOCUMENTS

| | | |
|---|---|---|
| CN | 109637367 | 4/2019 |
| TW | 201926013 | 7/2019 |

* cited by examiner

DISPLAY DEVICE FOR IN-SCREEN FINGERPRINT IDENTIFICATION

CROSS-REFERENCE TO RELATED APPLICATION

This application claims the priority benefit of Taiwan application no. 109125593, filed on Jul. 29, 2020. The entirety of the above-mentioned patent application is hereby incorporated by reference herein and made a part of this specification.

BACKGROUND

Technical Field

The disclosure relates to a device, and in particular, relates to a display device.

Description of Related Art

At present, in a display device, in order to achieve in-screen fingerprint identification, a pixel circuit is disposed on the display device, and a sensing circuit and a signal line structure required by fingerprint identification are further needed to be disposed on the display device. As such, the aperture ratio of the display device may be lowered.

SUMMARY

The disclosure provides a display device capable of providing in-screen fingerprint identification without lowering an aperture ratio of the display device.

A display device provided by an embodiment of the disclosure is adapted to perform in-screen fingerprint identification, and the display device includes a plurality of sub-pixel circuits, a plurality of light sensing circuit stages, and a plurality of sensing drive lines. The light sensing circuit stages correspond to the sub-pixel circuits. The sensing drive lines drive the light sensing circuit stages sequentially. In a first time interval, a first sensing drive line among the sensing drive lines provides a first sensing drive signal to a $q^{th}$ light sensing circuit stage and a latter light sensing circuit stage among the light sensing circuit stages. In the first time interval, the $q^{th}$ light sensing circuit stage performs a light sensing reset operation according to the first sensing drive signal, and the latter light sensing circuit stage performs a light sensing write operation according to the first sensing drive signal.

To sum up, in the display device provided by the disclosure, in-screen fingerprint identification is provided, a number of the sensing drive lines is lowered, and the aperture ratio of the display device is effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
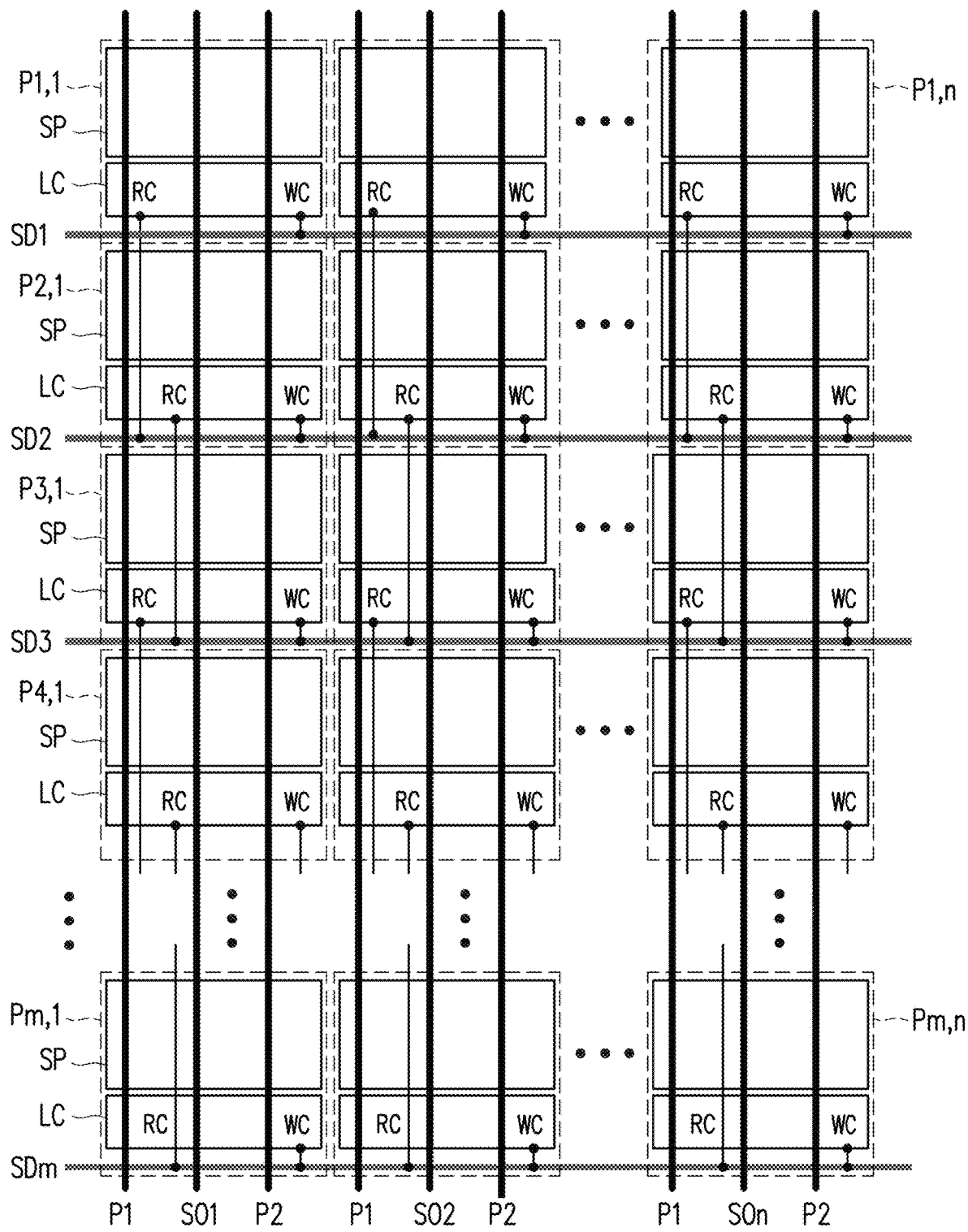
FIG. 1A is a schematic diagram of a display device according to an embodiment of the disclosure.

FIG. 1 is a schematic diagram of a display device 1 according to an embodiment of the disclosure. The display device 1 includes sub-pixel circuits SP, light sensing circuits LC, sensing drive lines SD1 to SDm, power rail lines P1 and P2, and output signal lines SO1 to SOn. In the display device 1, pixel circuits P1,1 to Pm,n may be formed by the light sensing circuits LC and the corresponding sub-pixel circuits SP. In this way, the display device 1 may display an image through the sub-pixel circuit SP in each of the pixel circuits P1,1 to Pm,n. Moreover, the display device 1 may further perform a light sensing operation further through the light sensing circuit LC in each of the pixel circuits P1,1 to Pm,n, so that the display device 1 is adapted to perform in-screen fingerprint identification.

To be specific, the light sensing circuits LC in each row of the display device 1 may form one light sensing circuit stage, and the sensing drive lines SD1 to SDm may be disposed corresponding to the light sensing circuit stages. Sequentially-enabled sensing drive signals may be transmitted on the sensing drive lines SD1 to SDm, such that the light sensing circuit stages may drive each stage of the light sensing circuit stages according to row orders to perform the light sensing operation.

Further, each of the light sensing circuits LC has a write control contact point WC and a reset control contact point RC configured to receive control signals to control a light sensing reset operation and a light sensing write operation of the light sensing circuit LC. In order to provide signals to the write control contact points WC and the reset control contact points RC of the light sensing circuits LC, the sensing drive lines SD1 to SDm may provide the sensing drive signals to two stages of the light sensing circuit stages. That is, each of the sensing drive lines SD1 to SDm may provide the sensing drive signal to two stages of the light sensing circuit stages of different driving orders. Regarding each of the light sensing circuits LC of the light sensing circuit stage of a higher row order (that is, the light sensing circuit stage which is enabled earlier for the light sensing operation), each of the sensing drive lines SD1 to SDm may provide the sensing drive signal to the reset control contact point RC of each of the light sensing circuits LC in the light sensing circuit stage. Regarding each of the light sensing circuits LC of the light sensing circuit stage of a lower row order (that is, the light sensing circuit stage which is enabled later for the light sensing operation), each of the sensing drive lines SD1 to SDm may provide the sensing drive signal to the write control contact point WC of each of the light sensing circuits LC in the light sensing circuit stage.

The control signals configured to control the light sensing reset operation and the light sensing write operation of the light sensing circuits LC require control signals having different time series. Further, in the display device 1, since the sensing drive lines SD1 to SDm provide the sensing drive signals to the different contact points of the light sensing circuit stages of different row orders at the same time, the light sensing circuit stage of a higher row order (i.e., enabled earlier) may perform the light sensing reset operation according to the sensing drive signals, and the light sensing circuit stage of a lower row order (i.e., enabled later) may perform the light sensing write operation according to the sensing drive signals. That is, in a time interval when one of the sensing drive lines SD1 to SDm is enabled, two light sensing circuit stages are enabled at the same time. The light sensing circuit stage of the higher row order (i.e., enabled earlier) is driven to perform the light sensing reset operation, and the light sensing circuit stage of the lower row order (i.e., enabled later) is driven to perform the light sensing write operation.

In short, in the display device 1, each of the sensing drive lines SD1 to SDm drives two light sensing circuit stages of different row orders, such that the light sensing circuit stage of the higher row order performs the light sensing reset operation, and the light sensing circuit stage of the lower row order performs the light sensing write operation. In this way, a clock control circuit configured to generate the control signals in the display device 1 may be effectively simplified, so that an overall design flow may be accelerated, and a chip area may be decreased. Further, in the display device 1, a number of the signal lines configured to provide the control signals may be effectively lowered, such that the sub-pixel circuit SP in each of the pixel circuits P1,1 to Pm,n may have a large active region for displaying, and an aperture ratio of the display device 1 may be further improved.

Figure 1B:
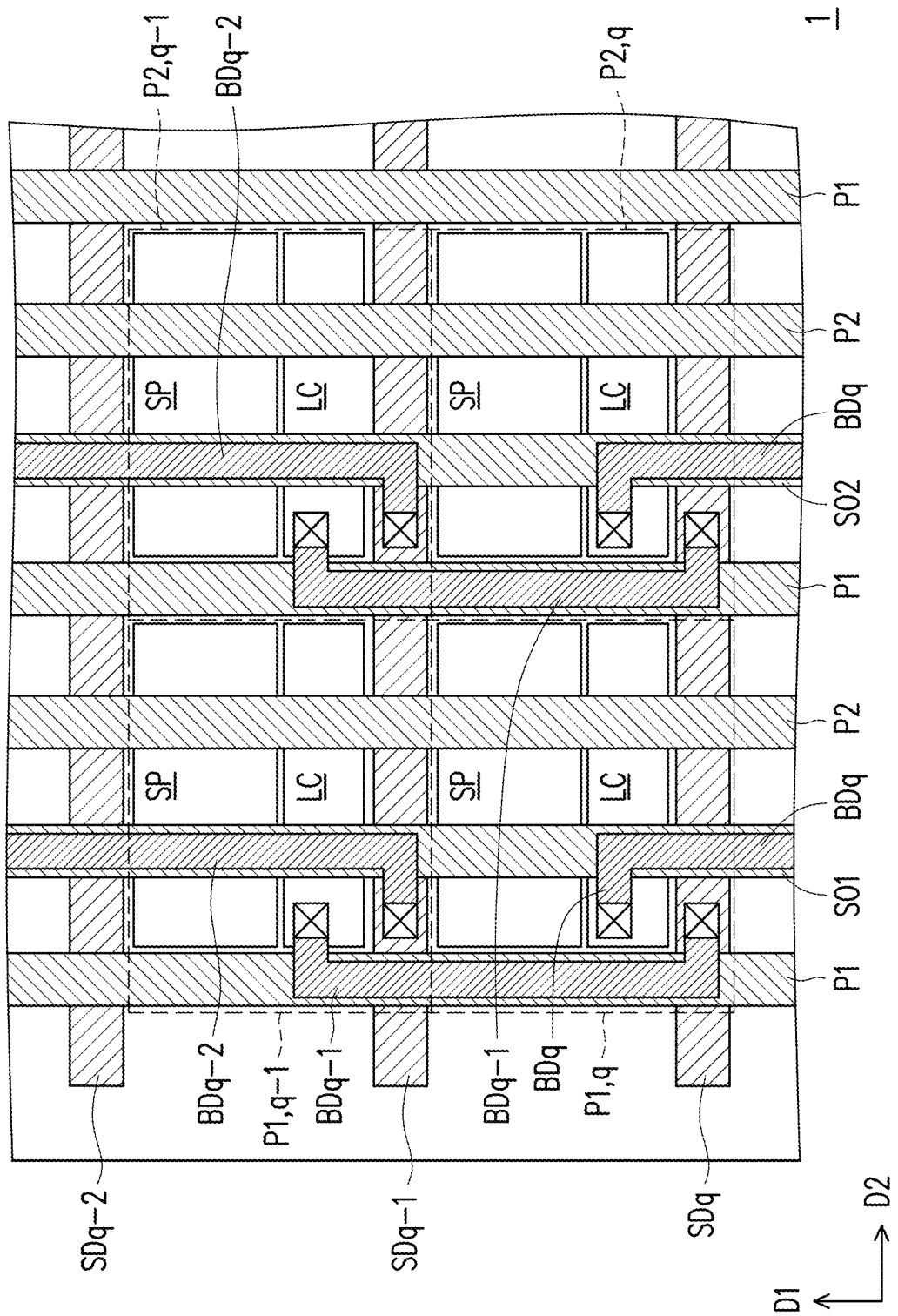
FIG. 1B is a schematic diagram of a layout of an enlarged local region of the display device according to an embodiment of the disclosure.

FIG. 1B is a schematic diagram of a layout of an enlarged local region of the display device 1 according to an embodiment of the disclosure. As shown in FIG. 1B, sensing drive lines SDq−2 to SDq may extend in a first direction D1 (e.g., x direction). Further, the sensing drive lines SDq−2 to SDq may be regularly arranged at a fixed interval in a second direction D2 (e.g., y direction) and are disposed parallel to each other. In addition, a bridging drive line BDq−2 may be configured to connect the sensing drive lines SDq−2 and SDq−1, and a bridging drive line BDq−1 may be configured to connect the sensing drive lines SDq−1 and SDq. Although in FIG. 1B, merely the sensing drive lines SDq−2 to SDq and the bridging drive lines BDq−2 and BDq−1 in the display device 1 are illustrated, an overall configuration of the sensing drive lines SD1 to SDm and bridging drive lines BD1 to BDm−1a in the display device 1 may be certainly deduced by a person of ordinary skill in the art according to a structure provided in FIG. 1B.

In the display device 1, the sensing drive lines SD1 to SDm may provide the sensing drive signals to drive the light sensing circuit stages of two stages. In this embodiment, the sensing drive lines SD2 to SDm may provide sensing drive signals to the light sensing circuit stages in the same row and the previous row. Although the drive line structure in which the sensing drive lines SD1 to SDm provide the sensing drive signals to the light sensing circuit stages in the same row is not illustrated in FIG. 1B, such a connection structure is known to a person of ordinary skill in the art, and description thereof is thus not provided herein. In addition, when the sensing drive lines SD2 to SDm provide the sensing drive signals to the light sensing circuit stages in the previous row, the sensing drive lines SD2 to SDm may provide drive control signals to the light sensing circuit stages in the previous row respectively through the bridging drive lines BD1 to BDm−1.

The bridging drive lines BD1 to BDm−1 may extend in the second direction (e.g., y direction). The bridging drive lines BD1 to BDm−1 may respectively cross a 2nd to a $m^{th}$ light sensing circuit stages, and the bridging drive lines BD1 to BDm−1 may respectively be connected to a 1st to a m−$1^{th}$ light sensing circuit stages. In addition a metal layer height disposed for the bridging drive lines BD1 to BDm−1 may be different from the metal layer heights of the power rail lines P1 and P2 and the output signal lines SO1 to SOn, such that the bridging drive lines BD1 to BDm−1 overlap the corresponding power rail lines P1 and P2 and the output signal lines SO1 to SOn. In this way, an aperture ratio drop of the display device 1 caused by arrangement of the bridging drive lines BD1 to BDm−1 is effectively prevented from occurring.

Therefore, in this embodiment, through the bridging drive lines BD1 to BDm−1, the display device 1 may provide a connection structure in which the sensing drive signals are provided to the light sensing circuit stages of the previous stage by the sensing drive lines SD2 to SDm without affecting the aperture ratio of the display device 1.

Figure 1C:
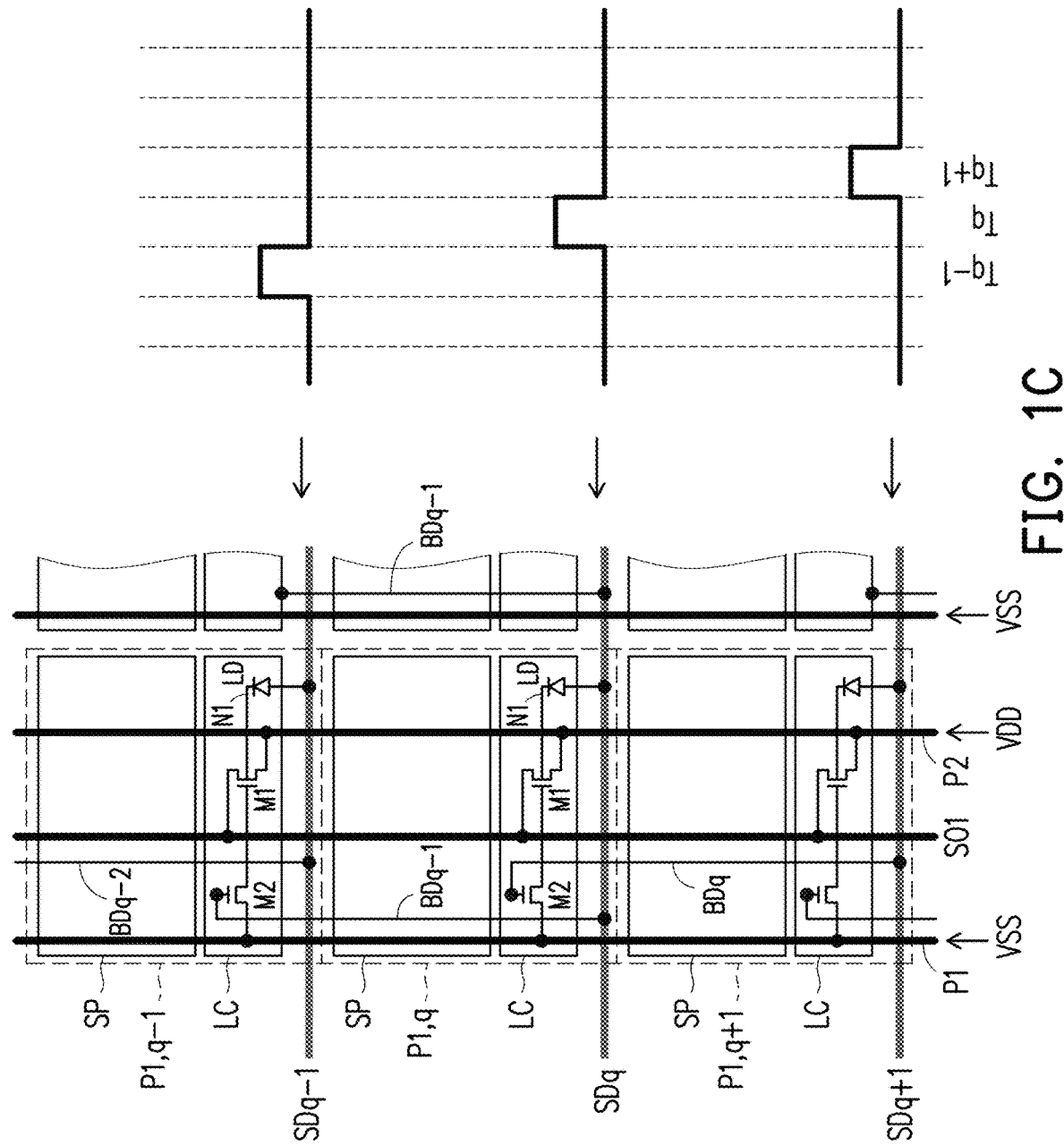
FIG. 1C is a circuit schematic diagram of the local region in the display device according to an embodiment of the disclosure.

FIG. 1C is a circuit schematic diagram of the local region in the display device 1 according to an embodiment of the disclosure. To be specific, the left of FIG. 1C illustrates the pixel circuits P1,q−1, P1,q, and P1,q+1 disposed in a q−$1^{th}$ row, a $q^{th}$ row, and a q+$1^{th}$ row in the display device 1, and the pixel circuits P1,q−1, P1,q, and P1,q+1 respectively belong to a q−$1^{th}$, a $q^{th}$, and a q+$1^{th}$ light sensing circuit stages. In this embodiment, each of the light sensing circuits LC has a light sensing element LD and transistors M1 and M2.

The light sensing element LD may be, for example, a photodiode. A first terminal (e.g., anode) of the light sensing element LD is coupled to the write control contact point WC of the light sensing circuit LC, and a second terminal (e.g., cathode) of the light sensing element LD is coupled to a node N1. A first terminal (e.g., drain) of the transistor M1 may receive an operating voltage VDD from the power rail line P2, and a second terminal (e.g., source) of the transistor M1 is coupled to one of the output signal lines SO1 to SOn. The light sensing element LD in the pixel circuit P1,q is treated as an example herein, the second terminal (e.g., source) of the transistor M1 is coupled to the output signal line SO1. A control terminal (e.g., gate) of the transistor M1 is coupled to the second terminal (e.g., cathode) of the light sensing element LD through the node N1. A first terminal (e.g., drain) of the transistor M2 is coupled to the second terminal (e.g., cathode) of the light sensing element LD through a node N1. A second terminal (e.g., source) of the transistor M2 may receive a ground voltage VSS through the power rail line P1. A control terminal (e.g., gate) of the transistor M2 is coupled to the reset control contact point RC of the light sensing circuit LC.

Figure 1D:
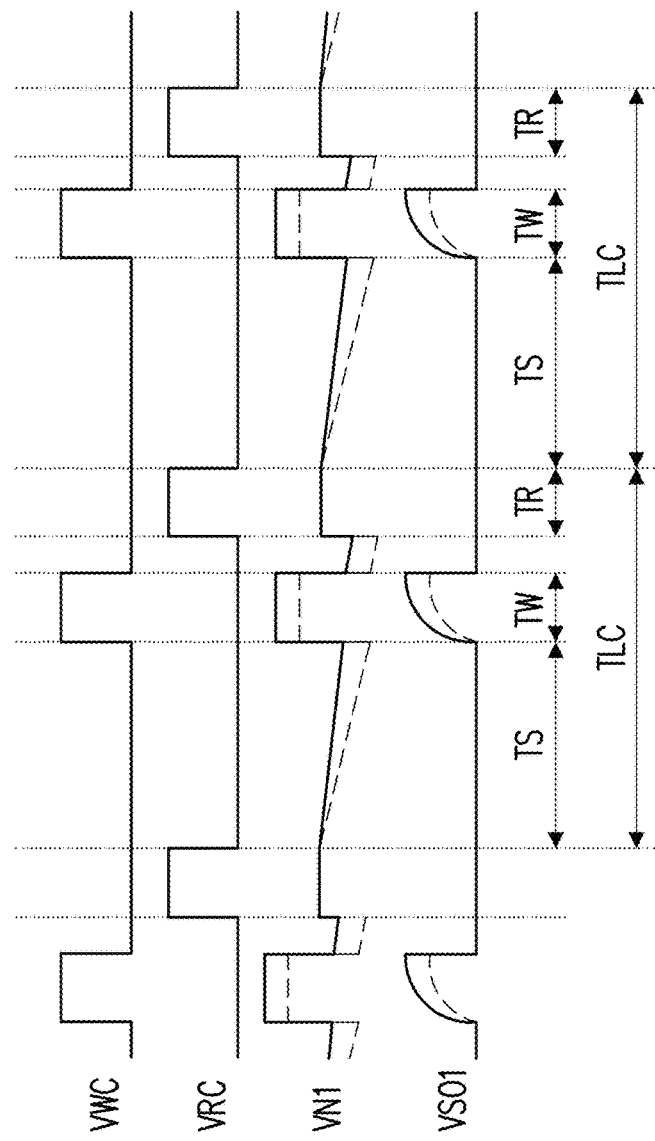
FIG. 1D is an operation waveform schematic diagram of a light sensing circuit according to an embodiment of the disclosure.
Figure 1D:
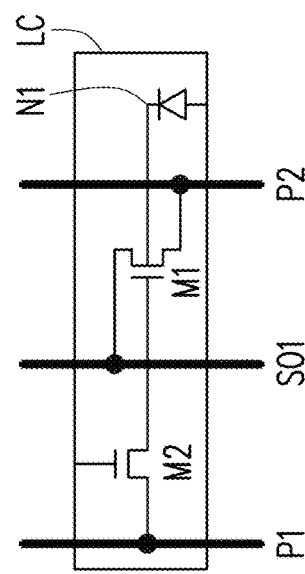

FIG. 1D is an operation waveform schematic diagram of one light sensing circuit LC according to an embodiment of the disclosure. The left of FIG. 1D schematically illustrates the light sensing circuit LC in a first column of a first row in the display device 1, and the right of FIG. 1D illustrates an operation waveform diagram of the light sensing circuit LC. Herein, voltages VWC, VRC, VN1, and VSO1 respectively represent voltage waveforms of the write control contact point WC, the reset control contact point RC, the node N1, and the output signal line SO1.

As shown in FIG. 1D, each light sensing operation of the light sensing circuit LC may be performed in a time interval TLC, and the time interval TLC for light sensing may have a sensing time interval TS, a write time interval TW, and a reset time interval TR. The light sensing circuit LC may perform a light sensing identification operation, the light sensing write operation, and the light sensing reset operation of the light sensing operation respectively in the sensing time interval TS, the write time interval TW, and the reset time interval TR. For instance, a solid line in the voltage VN1 may be a sensing result of weaker reflective light, and a dashed line in the voltage VN1 may be a sensing result of stronger reflective light.

In the sensing time interval TS, the light sensing element LD may sense light and generates a voltage value or a light sensing signal corresponding to light intensity on the node N1 for different light intensity, so as to perform the light sensing identification operation.

In the write time interval TW, the voltage VWC may be changed to an enable level, and the control terminal of the transistor M1 may accordingly receive a sum of the voltage VWC and the voltage value generated by the light sensing element LD. In this way, the transistor M1 may charge the output signal line SO1 according to both the voltage VWC and the light sensing signal generated by the light sensing element LD. That is, the light sensing circuit LC may receive control of the write control contact point WC to write a sensing result of the light sensing element LD to the output signal line SO1 to accordingly perform the light sensing write operation. Therefore, according to control of the voltage VWC, the transistor M1 may write the voltage VN1 onto the output signal line SO1 to generate the corresponding solid line and the dashed line parts in the voltage VSO1.

In the reset time interval TR, the voltage VRC may be changed to the enable level, and the transistor M2 may be accordingly turned on to provide the ground voltage VSS to the node N1 to reset a voltage of the node N1 to accordingly perform the light sensing reset operation. Therefore, the solid line and the dashed line parts of the voltage VN1 may have the same voltage level after being reset in the time interval TR.

Next, referring to FIG. 1C again, to be specific, the right of FIG. 1C illustrates a waveform schematic diagram of the sensing drive signals on a q−1$^{th}$, a q$^{th}$, and a q+1$^{th}$ sensing drive lines SDq−1, SDq, and SDq+1. The sensing drive signals provided on the sensing drive lines SDq−1 to SDq+1 may be enabled sequentially according to a row order of the sensing drive lines SDq−1 to SDq+1.

In a time interval Tq−1, the sensing drive signal provided on the q−1$^{th}$ sensing drive line SDq−1 may be enabled, is transmitted to the reset control contact point RC (not shown in FIG. 1) of the light sensing circuit LC of the q−2$^{th}$ light sensing circuit stage, and is transmitted to the write control contact point WC of the light sensing circuit LC of the q−1$^{th}$ light sensing circuit stage, so as to control the light sensing circuit LC of the q−1$^{th}$ light sensing circuit stage to perform the light sensing write operation.

In a time interval Tq, the sensing drive signal provided on the q$^{th}$ sensing drive line SDq may be enabled and is transmitted to the reset control contact point RC of the light sensing circuit LC of the q−1$^{th}$ light sensing circuit stage and the write control contact point WC of the light sensing circuit LC of the q$^{th}$ stage light sensing circuit stage, so as to control the light sensing circuit LC of the q−1$^{th}$ light sensing circuit stage to perform the light sensing reset operation and to control the light sensing circuit LC of the q$^{th}$ light sensing circuit stage to perform the light sensing write operation.

Similarly, in a time interval Tq+1, the sensing drive signal provided on the q+1$^{th}$ sensing drive line SDq+1 may be enabled and is transmitted to the reset control contact point RC of the light sensing circuit LC of the q$^{th}$ light sensing circuit stage and the write control contact point WC of the light sensing circuit LC of the q+1$^{th}$ light sensing circuit stage, so as to control the light sensing circuit LC of the q$^{th}$ light sensing circuit stage to perform the light sensing reset operation and to control the light sensing circuit LC of the q+1$^{th}$ light sensing circuit stage to perform the light sensing write operation.

Therefore, the clock control circuit in FIG. 1 may be effectively simplified, and the number of the signal lines providing the control signals may be decreased, and that manufacturing costs and the aperture ratio of the display device 1 may thus be significantly improved.

Figure 2:
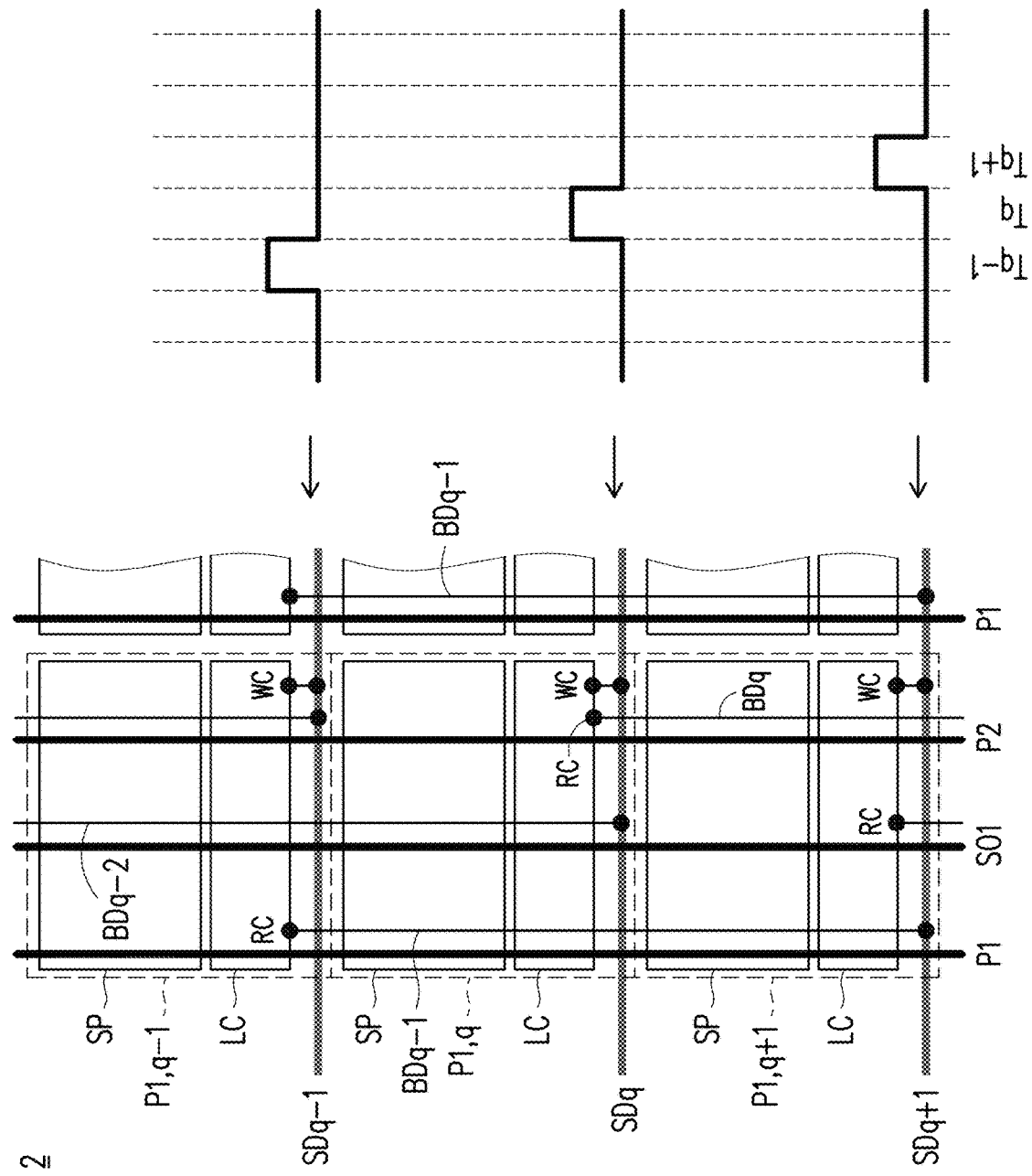
FIG. 2 is a circuit schematic diagram of a local region in a display device according to an embodiment of the disclosure.

FIG. 2 is a circuit schematic diagram of a local region in a display device 2 according to an embodiment of the disclosure. To be specific, the left of FIG. 2 illustrates the pixel circuits P1,q−1, P1,q, and P1,q+1 disposed in a q−1$^{th}$ row to a q+1$^{th}$ row of the display device 2, and the right of FIG. 2 illustrates a waveform schematic diagram of sensing drive signals provided to a q−1$^{th}$ to a q+1$^{th}$ sensing drive lines SDq−1 to SDq+1.

In the display device 2, the sensing drive lines SD1 to SDm may provide the sensing drive signals to the light sensing circuit stages in the same row and the light sensing circuit stages in previous two rows. The sensing drive line SDq+1 of the left of FIG. 2 is treated as an example herein, the sensing drive line SDq+1 may be coupled to the light sensing circuit stages in the q+1$^{th}$ row and the q−1$^{th}$ light sensing circuit stage. Further, the sensing drive line SDq+1 is coupled to the reset control contact point RC of the light sensing circuit LC of the light sensing circuit stage in the q−1$^{th}$ row, and the sensing drive line SDq+1 is coupled to the write control contact point WC of the light sensing circuit LC of the light sensing circuit stage in the q+1$^{th}$ row.

Therefore, a bridging drive line BDq−1 in the display device 2 may cross the q$^{th}$ and the q+1$^{th}$ light sensing circuit stages to provide the sensing drive signal provided by the sensing drive line SDq+1 to the q−1$^{th}$ light sensing circuit stage.

In this way, the light sensing circuit LC of the light sensing circuit stages in the q−1$^{th}$ row may receive control of the sensing drive signal from the sensing drive line SDq−1 in the time interval Tq−1 to perform the light sensing write operation and may receive control of the sensing drive signal from the sensing drive line SDq+1 in the time interval Tq+1 to perform the light sensing reset operation.

Figure 3:
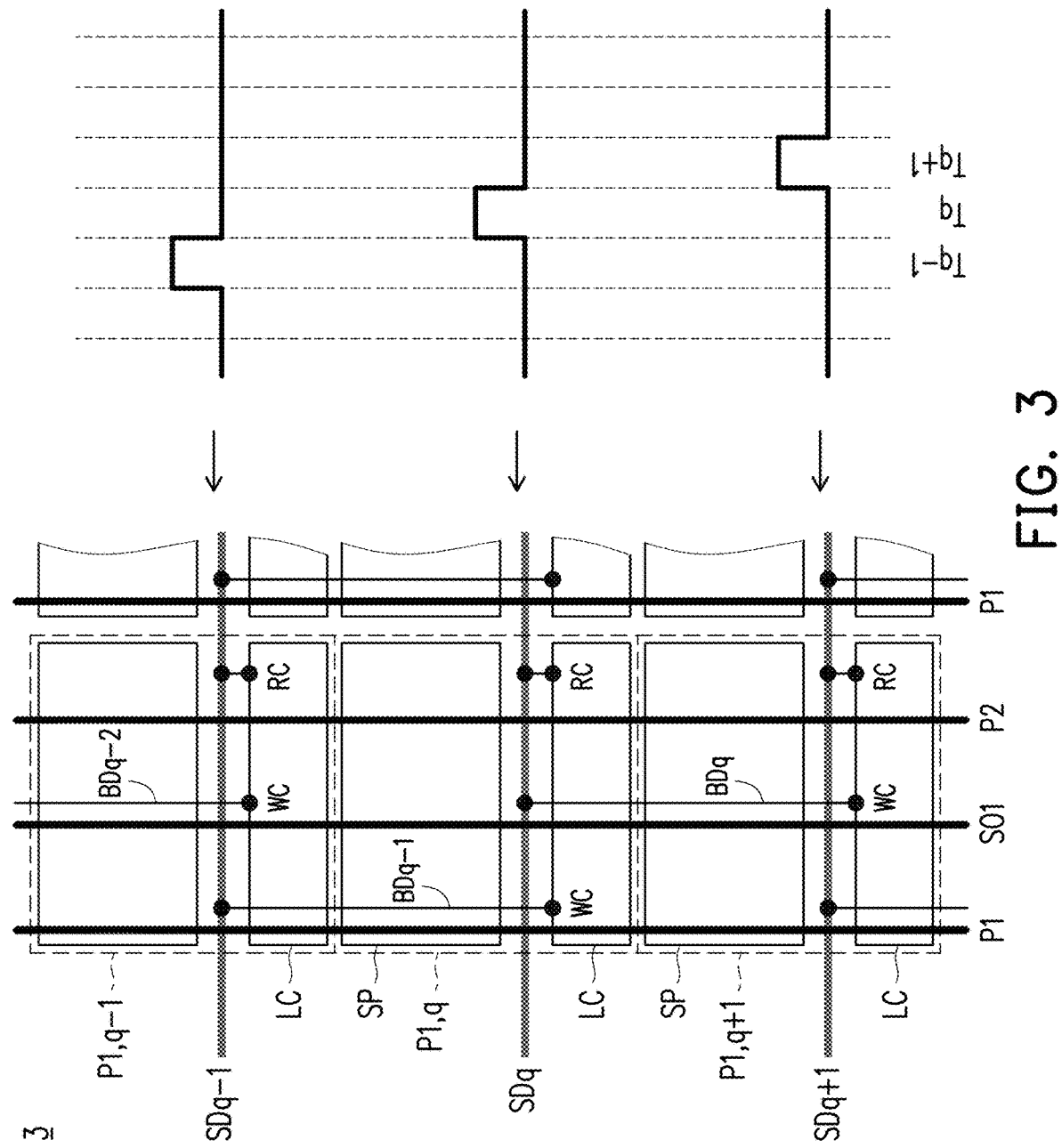
FIG. 3 is a circuit schematic diagram of a local region in a display device according to an embodiment of the disclosure.

FIG. 3 is a circuit schematic diagram of a local region in a display device 3 according to an embodiment of the disclosure. To be specific, the left of FIG. 3 illustrates the pixel circuits P1,q−1, P1,q, and P1,q+1 disposed in a q−1$^{th}$ row to a q+1$^{th}$ row of the display device 3, and the right of FIG. 3 illustrates a waveform schematic diagram of sensing drive signals provided to a q−1$^{th}$ to a q+1$^{th}$ sensing drive lines SDq−1 to SDq+1.

In the display device 3, the sensing drive lines SD1 to SDm may provide the sensing drive signals to the light sensing circuit stages in the same row and the light sensing circuit stages in the next row. The sensing drive line SDq of the left in FIG. 3 is treated as an example herein, the sensing drive line SDq is disposed between the q$^{th}$ sub-pixel circuit SP and the CO light sensing circuit LC. The sensing drive line SDq may be coupled to the $q^{th}$ light sensing circuit stage and the $q+1^{th}$ light sensing circuit stage. Further, the sensing drive line SDq may be coupled to the reset control contact point RC of the light sensing circuit LC of the light sensing circuit stage in the $q^{th}$ row. Moreover, the sensing drive line SDq may be coupled to the write control contact point WC of the light sensing circuit LC of the light sensing circuit stage in the $q+1^{th}$ row.

Therefore, a bridging drive line BDq in the display device 3 may cross the $q+1^{th}$ light sensing circuit stage to provide the sensing drive signal provided by the sensing drive line SDq to the $q+1^{th}$ light sensing circuit stage.

In this way, the light sensing circuit LC of the light sensing circuit stages in the $q^{th}$ row may receive control of the sensing drive signal from the sensing drive line SDq−1 in the time interval Tq−1 to perform the light sensing write operation and may receive control of the sensing drive signal from the sensing drive line SDq in the time interval Tq to perform the light sensing reset operation.

Figure 4:
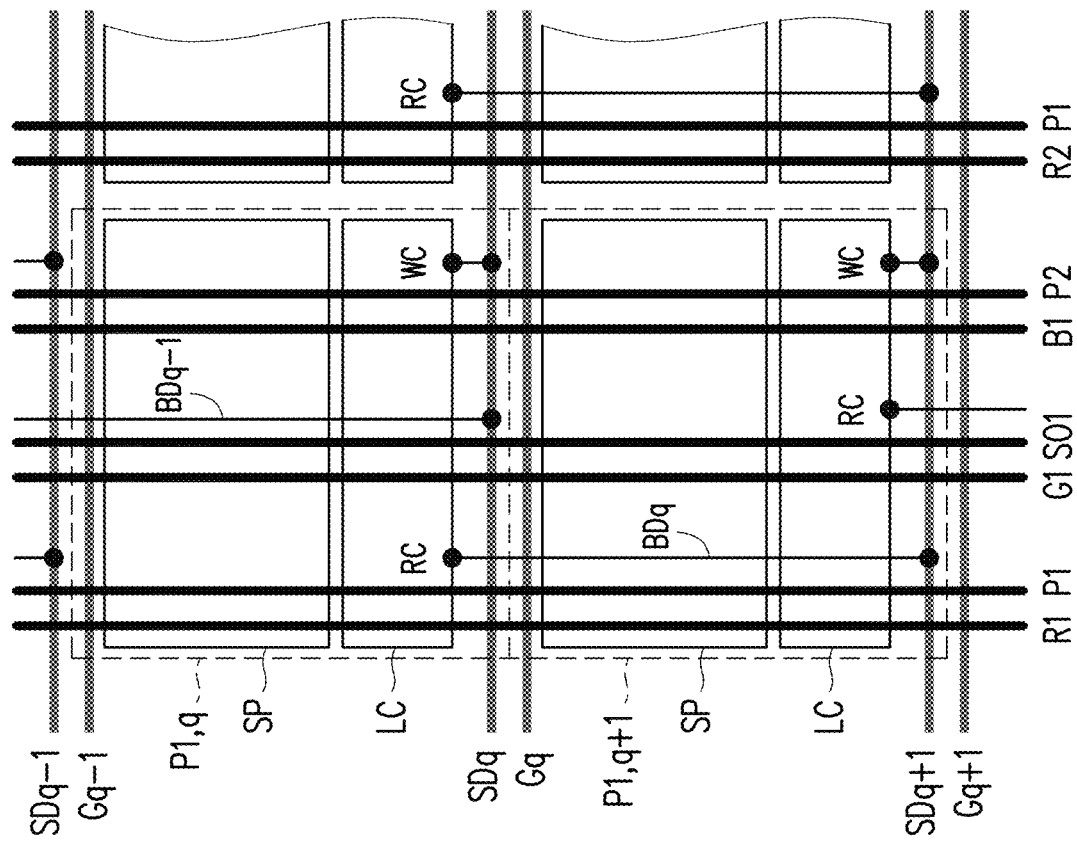
FIG. 4 is a circuit schematic diagram of a local region in a display device according to an embodiment of the disclosure.

FIG. 4 is a circuit schematic diagram of a local region in a display device 4 according to an embodiment of the disclosure. To be specific, the display device 4 illustrated in FIG. 4 is similar to the display device 1 illustrated in FIG. 1, and a difference therebetween is that displaying drive lines G1 to Gm and data drive lines R1 to Rn, G1 to Gn, and B1 to Bn are additionally disposed in the display device 4 in FIG. 4.

In this embodiment, the sub-pixel circuits SP and the light sensing circuits LC may be integrated on a single substrate in the display device 4. In this way, the display device 4 is not only provided with the sensing drive lines SD1 to SDm and the output signal lines SO1 to SOn provided to the light sensing circuits LC but also provided with the displaying drive lines G1 to Gm and the data drive lines R1 to Rn, G1 to Gn, and B1 to Bn provided to the sub-pixel circuits SP.

In other words, the disclosure not only includes the display device 1 in which the sub-pixel circuits SP and the light sensing circuits LC may be disposed on different substrates but also includes the display device 4 in which the sub-pixel circuits SP and the light sensing circuits LC may be disposed on the same substrate, and it thus can be seen that the disclosure may provide increased compatibility and may be widely applied.

In addition, modification to the embodiments may certainly be made by a person of ordinary skill in the art. For instance, among the two stages of the light sensing circuit stages coupled to the sensing drive lines SD1 to SDm, the light sensing circuit stage in the row of the sensing drive lines SD1 to SDm themselves is not required to be necessary included. For instance, regarding the sensing drive line SDq, the sensing drive line SDq may also provide the sensing drive signal to the SDq−$1^{th}$ and the SDq+$1^{th}$ light sensing circuit stages at the same time. As long as the sensing drive line SDq provides the sensing drive signal to the reset control contact point RC of the light sensing circuit stage of the higher row order and provides the sensing drive signal to the write control contact point WC of the light sensing circuit stage of the lower row order.

In addition, the sensing drive lines SD1 to SDm are not limited to provide the sensing drive signals to the light sensing circuit stages of two stages. According to different user needs and design concepts, each of the sensing drive lines SD1 to SDm may provide the sensing drive signals to more lines of the light sensing circuit stages. For instance, all of the light sensing circuit stages may be divided into a plurality of light sensing circuit groups, and the light sensing circuit groups may include light sensing circuit stages of different stage numbers such as five stages, ten stages, and fifteen stages. That is, when the light sensing operation is performed, the display device may individually drive the light sensing circuit groups. In the driven light sensing circuit groups, all of the light sensing circuit stages are driven at the same time and receive the same sensing drive signal. In this case, certainly, the sensing drive line is not coupled to two stages of the light sensing circuit stages only.

In view of the foregoing, in the display device 1 provided by the disclosure, each of the sensing drive lines drives at least two light sensing circuit stages of different row orders, such that the light sensing circuit stage of the higher row order performs the light sensing reset operation, and the light sensing circuit stage of the lower row order performs the light sensing write operation. In this way, the clock control circuit configured to generate the control signals in the display device may be effectively simplified, so that the overall design flow may be accelerated, and the chip area may be decreased. Further, in the display device, the number of the signal lines configured to provide the control signals may be effectively lowered, such that the sub-pixel circuit in each of the pixel circuits may have a large active region for displaying, and the aperture ratio of the display device may be further improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, adapted to perform in-screen fingerprint identification, the display device comprising:
    a plurality of sub-pixel circuits;
    a plurality of light sensing circuit stages, comprising a plurality of light sensing circuits, wherein the light sensing circuits correspond to the sub-pixel circuits;
    a plurality of sensing drive lines, driving the light sensing circuit stages sequentially and irrelevant to driving of the sub-pixel circuits;
    wherein in a first time interval, a first sensing drive line among the sensing drive lines provides a first sensing drive signal to a $q^{th}$ light sensing circuit stage and a latter light sensing circuit stage among the light sensing circuit stages,
    wherein in the first time interval, the CO light sensing circuit stage performs a light sensing reset operation according to the first sensing drive signal, and the latter light sensing circuit stage performs a light sensing write operation according to the first sensing drive signal.

2. The display device according to claim 1, wherein the sensing drive lines extend in a first direction, and the sensing drive lines are arranged and disposed parallel to each other in a second direction.

3. The display device according to claim 1, wherein a second sensing drive line among the sensing drive lines provides a second sensing drive signal to the latter light sensing circuit stage in a second time interval after the first time interval, wherein the latter light sensing circuit stage performs the light sensing reset operation according to the second sensing drive signal in the second time interval.

4. The display device according to claim 1, wherein each of the light sensing circuit stages comprises a write control contact point and a reset control contact point,
    wherein in the first time interval, the first sensing drive line provides the first sensing drive signal to the reset control contact point of the $q^{th}$ light sensing circuit stage, and the first sensing drive line provides the first sensing drive signal to the write control contact point of the latter light sensing circuit stage.

5. The display device according to claim 4, wherein each of the light sensing circuit stages comprises:
   a light sensing element, having a first terminal and a second terminal, wherein the first terminal of the light sensing element is coupled to the write control contact point of each of the light sensing circuit stages;
   a first transistor, having a first terminal, a second terminal, and a control terminal, wherein the first terminal of the first transistor receives an operating voltage, the second terminal of the first transistor is coupled to an output signal line, and the control terminal of the first transistor is coupled to the second terminal of the light sensing element; and
   a second transistor, having a first terminal, a second terminal, and a control terminal, wherein the first terminal of the second transistor is coupled to the second terminal of the light sensing element, the second terminal of the second transistor receives a ground voltage, and the control terminal of the second transistor is coupled to the reset control contact point of each of the light sensing circuit stages.

6. The display device according to claim 1, wherein the latter light sensing circuit stage senses light to generate a light sensing signal in a sensing time interval,
   the latter light sensing circuit stage writes the light sensing signal into a corresponding output signal line to perform the light sensing write operation according to control performed by the first sensing drive signal in the first time interval after the sensing time interval, and
   the latter light sensing circuit stage resets the light sensing signal to perform the light sensing reset operation according to control performed by a second sensing drive signal in a second time interval after the first time interval.

7. The display device according to claim 1, wherein the first sensing drive line is a $q+1^{th}$ sensing drive line, and the latter light sensing circuit stage is a $q+1^{th}$ light sensing circuit stage.

8. The display device according to claim 7, wherein the $q^{th}$ light sensing circuit stage is coupled to the $q+1^{th}$ sensing drive line through a bridging drive line to receive the first sensing drive signal to perform the light sensing reset operation.

9. The display device according to claim 1, wherein the first sensing drive line is a $q+2^{th}$ sensing drive line, and the latter light sensing circuit stage is a $q+2^{th}$ light sensing circuit stage.

10. The display device according to claim 9, wherein the $q^{th}$ light sensing circuit stage is coupled to the $q+2^{th}$ sensing drive line through a bridging drive line to receive the first sensing drive signal to perform the light sensing reset operation, wherein the bridging drive line crosses a $q+1^{th}$ light sensing circuit stage.

11. The display device according to claim 1, wherein the first sensing drive line is a $q^{th}$ sensing drive line, and the latter light sensing circuit stage is a $q+1^{th}$ light sensing circuit stage.

12. The display device according to claim 11, wherein the $q+1^{th}$ light sensing circuit stage is coupled to the $q^{th}$ sensing drive line through a bridging drive line to receive the first sensing drive signal to perform the light sensing write operation.

13. The display device according to claim 1, comprising:
   a first substrate, wherein the sub-pixel circuits are disposed on the first substrate; and
   a second substrate, wherein the light sensing circuits are disposed on the second substrate.

14. The display device according to claim 1, comprising:
   a first substrate, wherein the sub-pixel circuits and the light sensing circuits are disposed on the first substrate.

* * * * *